(12) United States Patent
Merhar et al.

(10) Patent No.: US 9,188,273 B2
(45) Date of Patent: Nov. 17, 2015

(54) SUPPORT FOOT FOR APPLYING AND DISTRIBUTING FORCES TO A PRESSURE-SENSITIVE SUBSTRATE AS WELL AS A STAND SYSTEM HAVING SUCH A SUPPORT FOOT

(71) Applicant: Hilti Aktiengesellschaft, Schaan (LI)

(72) Inventors: Thomas Merhar, Schaan (LI); Fritz Hermann, Landsberg (DE); Peter Ostermeier, Diessen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 13/907,322

(22) Filed: May 31, 2013

(65) Prior Publication Data

US 2013/0320161 A1    Dec. 5, 2013

(30) Foreign Application Priority Data

Jun. 4, 2012   (DE) .......................... 10 2012 209 395

(51) Int. Cl.
| | |
|---|---|
| F16M 11/20 | (2006.01) |
| F16M 11/00 | (2006.01) |
| E04D 11/00 | (2006.01) |
| E04D 13/12 | (2006.01) |
| F24J 2/52 | (2006.01) |
| F24F 13/32 | (2006.01) |

(52) U.S. Cl.
CPC ............. *F16M 11/00* (2013.01); *E04D 11/005* (2013.01); *E04D 13/12* (2013.01); *F24J 2/523* (2013.01); *F24J 2/525* (2013.01); *F24J 2/526* (2013.01); *F24J 2/5264* (2013.01); *F24F 13/32* (2013.01); *Y02E 10/47* (2013.01)

(58) Field of Classification Search
CPC ........ E04D 13/12; E04D 11/005; F24J 2/526; F24J 2/525; F24J 2/523; F24J 2/5264; Y02E 10/47; Y02B 10/20; F24F 13/32
USPC ............. 248/121, 188.1, 188.7, 188.8, 188.9, 248/677, 148, 354.1; 52/126.4, 126.5, 52/126.7, 262, 263
See application file for complete search history.

(56) References Cited

U.S. PATENT DOCUMENTS

| | | | | |
|---|---|---|---|---|
| 3,204,898 | A | * | 9/1965 | Manning ........................ 248/516 |
| 3,213,963 | A | * | 10/1965 | Ansgar ........................ 182/111 |
| 3,222,030 | A | * | 12/1965 | Thorpe ........................ 254/100 |
| 3,669,473 | A | * | 6/1972 | Martin et al. ................. 285/197 |

(Continued)

FOREIGN PATENT DOCUMENTS

| | | |
|---|---|---|
| DE | 16 59 314 | 9/1971 |
| DE | 25 03 964 | 8/1976 |

(Continued)

*Primary Examiner* — Anita M King
(74) *Attorney, Agent, or Firm* — Davidson, Davidson & Kappel, LLC

(57) ABSTRACT

A support foot (10) for applying and distributing forces to a pressure-sensitive substrate, including a baseplate (12) for placement onto the substrate and a holder (18) which is joined to the baseplate (12) and to which the connecting parts (32, 72) can be attached, whereby the holder (18) has a first receptacle (20) for a first connecting part (72) and a second receptacle (22) for a second connecting part (32). A stand system has at least one support foot (10) and at least one, especially C-shaped, mounting rail that is inserted into a receptacle (20, 22, 24) and that is prevented by a fastener (56) from being pulled out of the holder (18).

11 Claims, 3 Drawing Sheets

(56) References Cited

U.S. PATENT DOCUMENTS

| | | | |
|---|---|---|---|
| 3,899,857 A * | 8/1975 | Mochizuki | 52/126.6 |
| 4,630,417 A * | 12/1986 | Collier | 52/263 |
| 4,850,162 A * | 7/1989 | Albrecht | 52/126.6 |
| 4,922,670 A * | 5/1990 | Naka et al. | 52/126.6 |
| 5,048,242 A * | 9/1991 | Cline | 52/126.6 |
| 5,603,187 A * | 2/1997 | Merrin et al. | 52/58 |
| 6,226,937 B1 * | 5/2001 | Carlton | 52/169.5 |
| 6,863,253 B2 * | 3/2005 | Valentz et al. | 248/519 |
| 7,219,872 B2 * | 5/2007 | Walker | 248/516 |
| 7,650,726 B2 * | 1/2010 | Jakob-Bamberg et al. | 52/263 |
| 7,703,729 B1 * | 4/2010 | Nourollahi | 248/188.9 |
| 8,112,947 B2 * | 2/2012 | Mead | 52/126.4 |
| 8,555,579 B2 * | 10/2013 | Zlatar | 52/263 |
| 2001/0019096 A1 * | 9/2001 | Andreoli et al. | 248/188.8 |
| 2007/0272234 A1 | 11/2007 | Allen et al. | |
| 2008/0121273 A1 | 5/2008 | Plaisted et al. | |
| 2009/0188189 A1 | 7/2009 | Repasky | |
| 2011/0303807 A1 * | 12/2011 | Van Walraven | 248/205.1 |

FOREIGN PATENT DOCUMENTS

| | | |
|---|---|---|
| DE | 30 22 142 | 12/1981 |
| DE | 20 2007 005 777 | 6/2007 |
| EP | 2 228 501 B1 | 9/2010 |
| JP | 2012 002044 | 1/2012 |
| KR | 2010 0018915 | 2/2010 |

* cited by examiner

SUPPORT FOOT FOR APPLYING AND DISTRIBUTING FORCES TO A PRESSURE-SENSITIVE SUBSTRATE AS WELL AS A STAND SYSTEM HAVING SUCH A SUPPORT FOOT

This claims the benefit of German Patent Application DE 10 2012 209 395.8, filed Jun. 4, 2012 and hereby incorporated by reference herein.

The invention relates to a support foot for applying and distributing forces to a pressure-sensitive substrate, comprising a baseplate for placement onto the substrate and a holding element which is joined to the baseplate and to which the connecting parts can be attached. Moreover, the invention relates to a stand system having such a support foot.

BACKGROUND

Stand systems having such support feet are, for example, installations on stands mounted on flat roofs, such as ventilation conduits or ventilation aggregates, air-conditioning systems, pipelines or ductwork. Since flat roofs often have pressure-sensitive sealing films or bitumen sheeting, there is a need to distribute the support load by means of appropriate support feet. Other applications for stand systems having support feet are scaffolding or temporary installations such as bleachers, whereby here, the load is applied to an asphalt surface or to a ground surface.

European patent EP 2 228 501 B1 discloses a support foot of the generic type, which has a base part as well as a sliding part that can be moved at a slant relative to the base part by a few degrees in an axial direction, whereby a vertically oriented mounting rail can be attached to said sliding part. A separate replaceable sliding part is provided so that a horizontally oriented rail can be attached.

SUMMARY OF THE INVENTION

It is an object of the present invention to provide a support foot or a stand system that is characterized in that it is easy to handle and can be used universally.

For this purpose, according to a first aspect of the invention, a support foot of the above-mentioned type is provided, in which the holding element has a first receptacle for a connecting part and a second receptacle for a connecting part. In this manner, two connecting parts (for instance, mounting rails) can be attached to the support foot at the same time, or else just one of the receptacles on the holding element can be used for a single connecting part. Thus, the invention creates a support foot that has a wide array of joining possibilities for connecting parts and that is thus particularly simple to adapt to the specific requirements of use.

Preferably, the first receptacle and the second receptacle are oriented at a slant, particularly perpendicularly, with respect to each other. This allows the simultaneous joining of two connecting parts that extend in different axial directions. This embodiment is also advantageous when the support foot is used with only one connecting part since, in contrast to known support feet, the connecting parts that have a different orientation relative to the support foot can be joined using one and the same holding element.

According to a preferred embodiment, the first receptacle is flush with a third receptacle for a connecting part, in particular, it makes a transition into the third receptacle, and the three receptacles are preferably arranged so as to be T-shaped with respect to each other. Thus, the connecting parts can be joined to the holding element from three sides, especially, they can be inserted into this holding element. When the first and the third receptacles make a transition into each other, a connecting part can be simultaneously held by the first and the third receptacles. In particular, the connecting part can be pushed through the first and the third receptacle and thus through the holding element.

As an alternative, it would be conceivable for all three receptacles to be arranged perpendicular to each other, in other words, so that they preferably form an orthogonal base.

Preferably, in a basic position of the holding element, the first receptacle extends essentially parallel to a placement surface on the underside of the baseplate. Thus, when the support foot is used in a stand system installed on a flat roof, the first receptacle is suitable for being joined to an elongated connecting part that is oriented horizontally, while a second receptacle arranged perpendicular to the first receptacle can then simultaneously or alternatingly secure a vertically oriented connecting part. In this context, the term "basic position" of the holding element refers to a position in which the holding element is not positioned at a slant with respect to the baseplate, which can be desirable, for example, in order to compensate for a (slight) inclination of the substrate.

The first receptacle and the second receptacle can have an overlapping area so that the second receptacle makes a transition into the first receptacle, and a connecting part can protrude through the second receptacle into the first receptacle. If a connecting part is held only in the second receptacle, it can be affixed even more securely.

Since the installations for which such support feet are used are often mounting rail constructions having so-called C-profile rails as the connecting parts, the receptacles preferably have a rectangular, especially square, cross section and especially the same cross section. For this reason, the support foot can be combined with commercially available components and can thus be used in an inexpensive and versatile manner. Moreover, a square cross section allows the mounting rails to be joined in 90° increments, namely, by turning the rail around its longitudinal axis.

The first receptacle and/or the third receptacle can have a lower, preferably shared, holding wall, particularly having at least one fastening recess. In addition or as an alternative, fastening recesses can also be provided in other holding walls of the receptacles. In an especially preferred embodiment, the first receptacle as well as the third receptacle have at least one fastening recess, especially in a shared lower holding wall.

Furthermore, at least one of the first and third receptacles can have at least one, preferably two, side holding walls, preferably with a fastening recess, in order to tightly secure the connecting part held therein.

Advantageously, the holding element has two fastening recesses arranged one under the other for purposes of securing a connecting part arranged in the second receptacle.

The fastening recess or fastening recesses that are preferably configured as a through hole serve to receive a fastening element, for instance, by means of a bolt and a wing nut with which a given connecting part is secured in the appertaining receptacle.

The fastening element can comprise, for example, a bolt, especially a screw, as well as a wing nut arranged in the area of the receptacle inside the connecting part.

Especially preferably, the first receptacle, and optionally the third receptacle, are configured so as to be U-shaped, while the second receptacle is configured so as to be ring-shaped.

In one particularly preferred embodiment, the holding walls of all of the receptacles make a transition into each other so as to form one piece; for example, they can be bent out of a metal sheet. In particular, the first and the third receptacles can be formed by a U-shaped bent metal sheet while the second receptacle is formed by tabs that are angled away from the leg ends of the U-shaped bent metal sheet and that combine to form a ring. Here, the receptacles are preferably arranged in a T-shape with respect to each other. The holding element is thus a simple bent part configured in one piece and made of a metal sheet, which is stable in terms of its structure and inexpensive to manufacture.

Since it is often the case that the substrate on which such a support foot rests is (slightly) slanted so that water can run off, for example, in the case of a flat roof, the baseplate and the holding element are preferably joined to each other so that the angle of inclination can be adjusted, whereby a locking means is provided in order to firmly position the baseplate and the holding element with respect to each other at the selected angle of inclination. Thus, the installation provided on the slanted substrate can be oriented horizontally or vertically very precisely by means of an angle compensation on the support foot.

Advantageously, the baseplate has a first sliding section with a round hole into which one end of the holding element engages. As a result, the holding element can be swiveled vis-à-vis the baseplate in at least two spatial directions, whereas the support feet known from the state of the art, which employ a slot for adjusting the inclination, only allow an angle adaptation in one spatial direction.

Preferably, the first sliding section is configured so as to be shaped like a spherical cap, and especially, a second sliding section that is shaped like a spherical cap and that is in contact with the first sliding section is situated on the holding element. Such a universal ball joint constitutes a simple configuration of an articulated joint that can be adjusted, especially pivoted and turned, in several directions. It also allows a rotation of the holding element around the vertical, so that an approximately vertical connecting part accommodated in the second receptacle can be turned around its longitudinal axis.

In order to attain, for instance, a connection of the baseplate and the holding element that can be reliably secured and whose angle of inclination can be adjusted, the holding element can have a locking section that is preferably shaped like a spherical cap and that engages behind the first sliding section of the baseplate. In order to secure the angular position of the holding element, the sliding section of the baseplate can be clamped between the sliding section of the holding element and another element, especially the locking section.

According to another aspect of the invention, a stand system having at least one support foot of the above-mentioned type is provided which additionally has at least one, especially C-shaped, mounting rail that forms the connecting part, that is inserted into a receptacle and that is prevented by a fastener from being pulled out of the holding element. As already mentioned, such fasteners may especially comprise wing nuts that are inserted into the C-rail from the open side and that engage behind the edges of the rail that are bent inwards.

BRIEF DESCRIPTION OF THE DRAWINGS

Additional features and advantages of the invention ensue from the description below of several advantageous embodiments making reference to the accompanying drawing. The following is shown.

DETAILED DESCRIPTION

Figure 1:
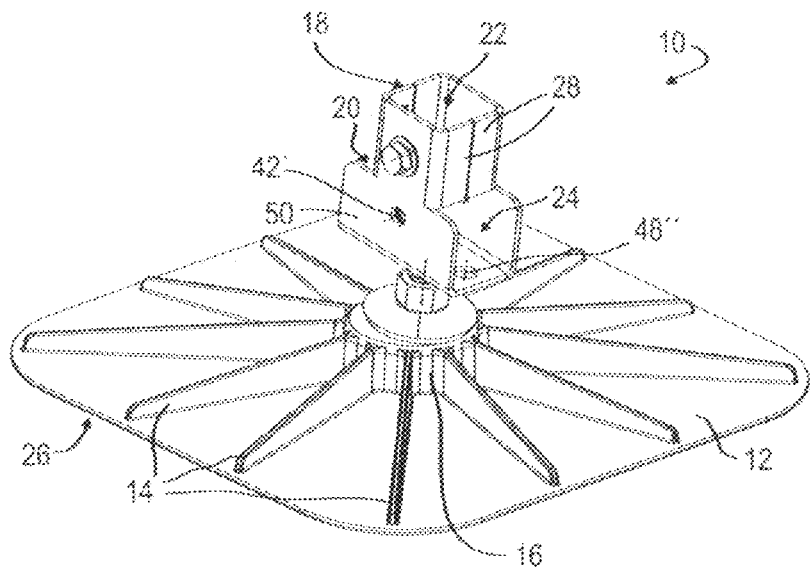
FIG. 1: a perspective view of a support foot according to the invention.

FIG. 1 shows a support foot 10 according to the invention, for applying and distributing forces to a pressure-sensitive substrate. The support foot 10 has a baseplate 12 for direct or indirect placement onto the substrate and it can consist, for example, of an injection-molded part made of plastic or metal, and, for example, it has several reinforcement ribs 14 that extend outward from a central cylindrical area 16.

In the embodiment shown in FIG. 1, the baseplate 12 has an approximately square shape with rounded-off corners, although it could also have any other desired shape, for instance, rectangular or round.

Figure 2:
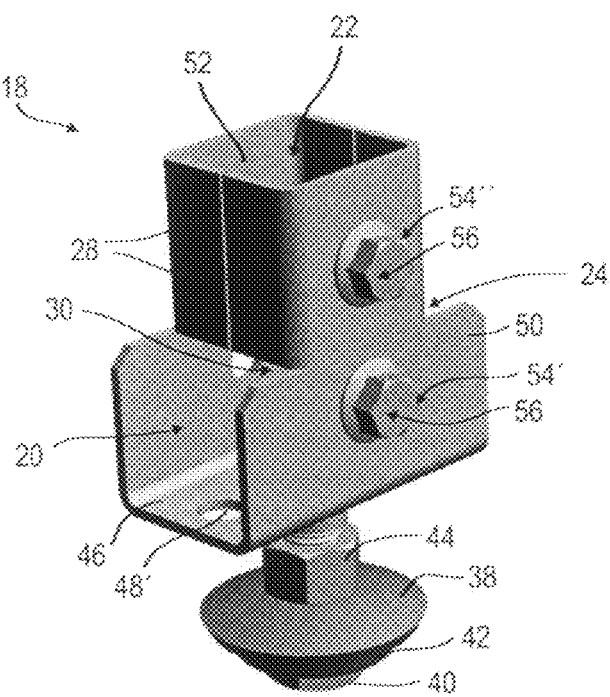
FIG. 2: a perspective view of a holding element of the support foot from FIG. 1.
Figure 7:
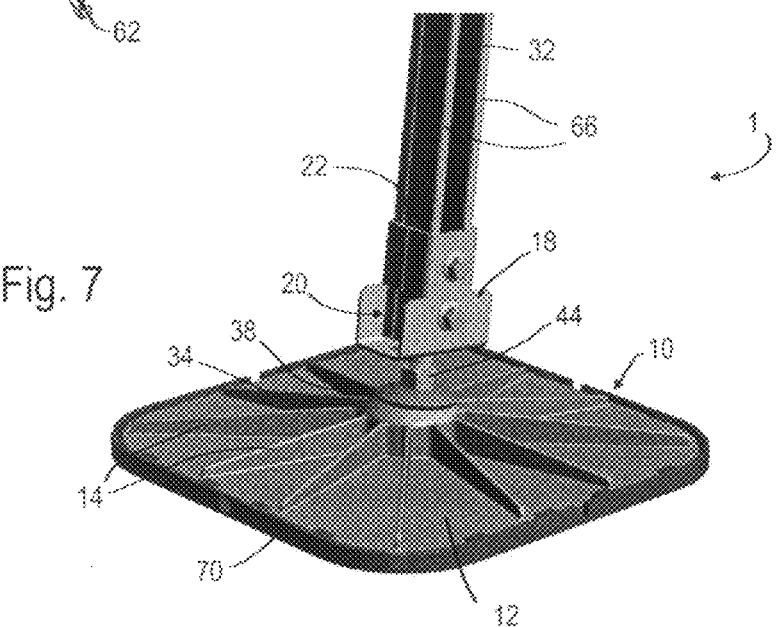
FIG. 7: a perspective partial view of a second embodiment of a stand system according to the invention.
Figure 8:
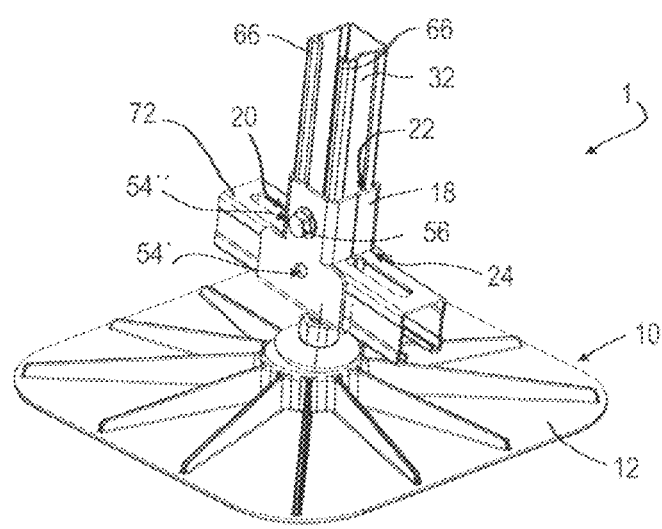
FIG. 8: a perspective partial view of a third embodiment of a stand system according to the invention.

The support foot 10 also comprises a holding element 18 which is shown separately in FIG. 2 and to which several connecting parts, especially C-shaped mounting rails of the type shown in FIGS. 7 and 8, can be attached.

For this purpose, the holding element 18 has a first receptacle 20, a second receptacle 22 and a third receptacle 24, into each of which a mounting rail can be inserted.

In this context, the first receptacle 20 and the second receptacle 22 are oriented perpendicular to each other, whereas the third receptacle 24 is flush with the first receptacle 20 and makes a transition into the first receptacle 20. As can be seen in the figures, the third receptacles 20, 22, 24 thus have a T-shaped configuration.

In the basic position of the holding element 18 shown in FIG. 1, the first receptacle 20 and the third receptacle 24 extend essentially parallel to a placement surface 26 on the underside of the baseplate 12 by means of which the baseplate 12 or the entire support foot 10 rests on the substrate.

The first receptacle 20 and the third receptacle 24 are formed by a U-shaped bent metal sheet at whose leg ends that are tabs 28 that are angled away and that combine to form a preferably closed ring, or else fundamentally, an open ring having a square cross section, thus forming the second receptacle 22.

Figure 3:
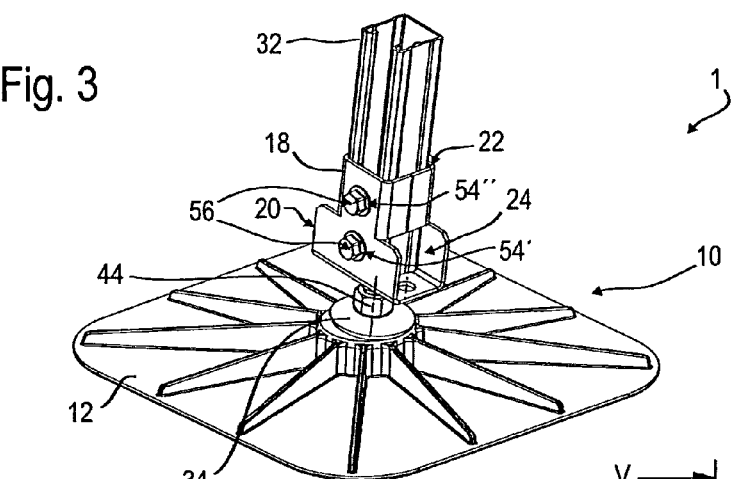
FIG. 3: a perspective partial view of a first embodiment of a stand system according to the invention.
Figure 4:
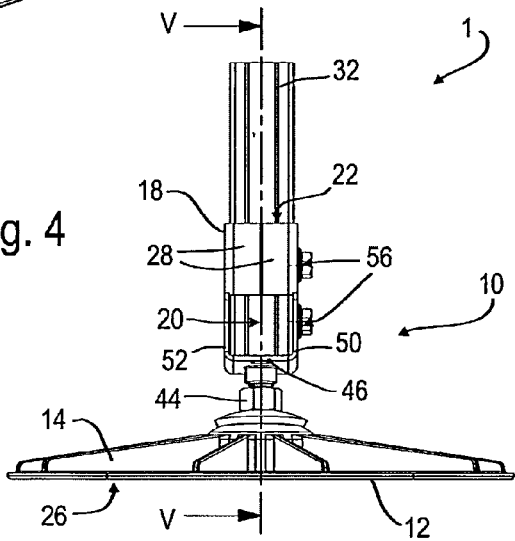
FIG. 4: a side view of the stand system from FIG. 3.
Figure 5:
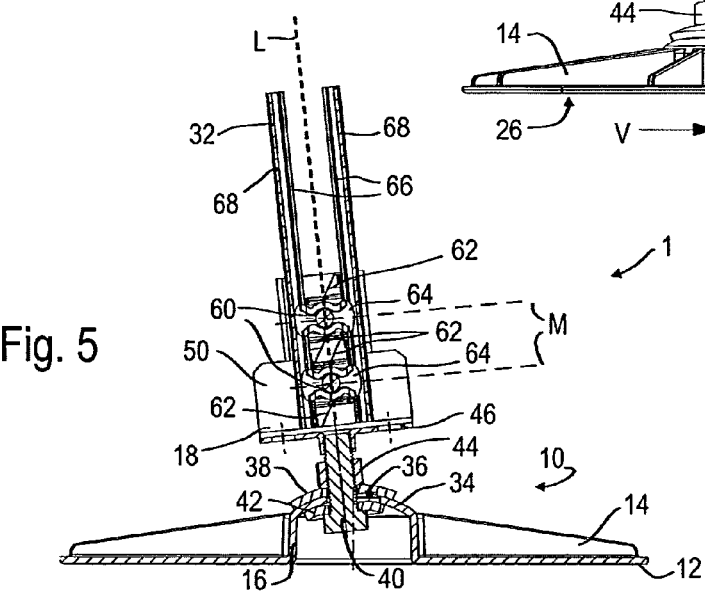
FIG. 5: a sectional view of the stand system along the line V-V in FIG. 4.

Owing to the one-piece configuration, the first receptacle 20 and the second receptacle 22, or the second receptacle 22 and the third receptacle 24, have an overlapping area 30 so that, as can be seen in FIGS. 3 to 5, a vertically oriented connecting part 32—here a C-shaped mounting rail—can protrude through the second receptacle 22 into the first receptacle 20 and into the third receptacle 24.

All of the receptacles 20, 22 and 24 also have a shared cross section so that one and the same connecting part 32 can be inserted into any one of the receptacles.

The support foot 10 and the connecting part 32 form one part of a stand system 1 which is employed, for example, for the installation of ventilation conduits, air-conditioning systems or the like on flat roofs.

Here, in order to compensate for a slant of the substrate, the baseplate 12 and the holding element 18 are joined to each other in such a way that the angle of inclination can be adjusted (in particular, see FIG. 5), namely, by means of a universal ball joint that is formed by a first sliding section 34 shaped like a spherical cap and having a round hole 36 (or else a slot), and that is provided on the baseplate 12 in the central cylindrical area 16.

Moreover, the universal ball joint comprises a second sliding section 38 that is arranged on the holding element 18 and that rests at least partially on the first sliding section 34. At a lower end 40 of the holding element 18 that projects into the round hole 36, parallel to this second sliding section 38, which is likewise shaped like a spherical cap, there is a locking section 42 that is shaped like a spherical cap and that engages behind the first sliding element 34 of the baseplate 12, that is to say, it presses from below against the sliding section 34. The sections 34 and 38, which are shaped like spherical caps, and the locking section 42, likewise shaped like a spherical cap, preferably all have the same center point, which ensures reliable pivoting.

Owing to the universal ball joint, the angle of inclination of the holding element 18 can be adjusted relative to the baseplate 12 in any desired direction in a plane parallel to said baseplate 12, whereby the maximum adjustment angle is prescribed by the size of the round hole 36.

In order to firmly position the baseplate 12 and the holding element 18 at a slant that has been selected, a locking means 44 in the form of a nut is arranged on the holding element 18 directly above the second sliding section 38 and it acts on said second sliding section 38 in such a way that any additional, unintentional shifting of the universal ball joint is not possible since the sliding section 34 is clamped between the sections 38 and 42.

As can be best seen in FIG. 2, the first receptacle 20 and the third receptacle 24 have a shared lower holding wall 46 that runs approximately parallel to the contact surface 26 of the baseplate 12 when the angle of inclination of the basic position of the holding element 18 has not been adjusted.

In this shared lower holding wall 46, there are two fastening recesses 48' and 48", whereby one fastening recess 48' is located in the area of the first receptacle 20, while the other fastening recess 48" is located in the area of the third receptacle 24.

Furthermore, the first receptacle 20 and the third receptacle 24 are limited by two side holding walls 50 and 52 that, at the same time, form opposite side holding walls for the second receptacle 22.

Figure 6:
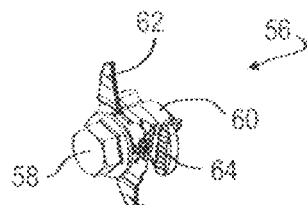
FIG. 6: a fastener of the stand system of the preceding figures.

In this context, the side holding wall 50 has two fastening recesses 54' and 54" into which the turn-fastener 56—here in the form of screws 58 with the associated wing nuts 60—are inserted (in particular, see FIG. 6).

The fastening recesses 54' and 54" are arranged one above the other and parallel to a longitudinal axis L of the connecting part 32, whereby the distance of the lower fastening recess 54' from the lower holding wall 46 as well as the distance between the two fastening recesses 54' and 54" are selected in such a way as to yield the easiest possible pre-installation.

As is shown in FIG. 6, the turn-fastener 56 comprises a head bolt 58 and a wing nut 60 arranged thereon and having two wings 64 by means of which the wing nuts 60 engage behind the inward bent edges 66 of the free ends of the side legs 68 of the U-shaped connecting part 32. Preferably, the turn-fastener 56 can also have a pressure plate 62.

FIG. 7 shows another embodiment of the stand system 1 according to the invention, whereby here, there is also a cushioning or anti-slip mat 70 that is arranged on the lower placement surface 26 of the baseplate 12.

FIG. 8 shows a third embodiment of the stand system 1 according to the invention. Here, aside from the vertical connecting part 32, there is a second connecting part 72 that extends essentially in the horizontal direction and that penetrates through the first receptacle 20 as well as through the third receptacle 24, both of which are likewise C-profile rails.

Unlike in the embodiment having only one vertical connecting part 32 (FIGS. 3 to 5 and 7), in the case of two connecting parts 32, 72, the vertical connecting part 32 is secured in the upper fastening recess 54" only by means of a turn-fastener 56. The horizontal connecting part 72 is secured to the holding element 18 from below in the first and third receptacles 20, 24 by means of the fastening recesses 48' and 48". A conceivable alternative would also be fastening by means of only one of the two fastening recesses 48' or 48".

It can also be provided that another connecting part is held in each of the three receptacles 20, 22 and 24. Here, due to the overlapping area 30, the connecting part preferably can protrude into the second receptacle between the two other connecting parts of the first and third receptacles that are flush with each other.

Depending on the number or arrangement of the connecting parts 32, 72, these can also be affixed by means of different fastening recesses 48', 48", 54', 54".

Moreover, since the vertical connecting part 32 as well as the horizontal part 72 can have slots in the lower wall opposite from the elongated slot and in the side walls, the support foot 10 can be joined in 90° increments (rotation around the longitudinal axis of the rail).

Owing to the universal ball joint, the horizontal connecting part 72 can also be continuously turned around the vertical relative to the baseplate 12.

Without replacing the holding element 18, either a horizontal connecting part 72 or a vertical connecting part 32, or else a horizontal and a vertical connecting part can be attached simultaneously to the support foot 10 according to the invention. Moreover, it is, of course, also possible to provide two horizontal connecting parts 72, one of which is held in the first receptacle 20 while the other is held in the third receptacle 24, with or without an additional vertical connecting part 32.

What is claimed is:

1. A support foot for applying and distributing forces to a pressure-sensitive substrate, comprising:
    a baseplate for placement onto the substrate;
    a holder joined to the baseplate, first and second connecting parts being attachable to the holder, the holder having a first receptacle for the first connecting part and a second receptacle for the second connecting part, wherein the first receptacle is flush with a third receptacle for the first connecting part or a further connecting part; and
    the first receptacle makes a transition into the third receptacle, the first, second and third receptacles being arranged so as to be T-shaped with respect to each other.

2. The support foot as recited in claim 1 wherein in a basic position of the holder, the first receptacle extends parallel to a placement surface on the underside of the baseplate.

3. The support foot as recited in claim 1 wherein the first and second receptacles have a rectangular cross section and/or the same cross section.

4. The support foot as recited in claim 1 wherein the first receptacle and/or the third receptacle have a lower holding wall having at least one fastening recess.

5. The support foot as recited in claim 4 wherein the first and third receptacle share the lower holding wall.

6. The support foot as recited in claim 1 wherein at least one of the first and second receptacles has at least one side holding wall.

7. The support foot as recited in claim 6 wherein the at least one side holding wall includes two side holding walls.

8. The support foot as recited in claim 7 wherein the first and the third receptacles are formed by a U-shaped bent metal sheet while the second receptacle is formed by tabs angled away from leg ends of the U-shaped bent metal sheet, the tabs combining to form a ring.

9. A stand system comprising:
   at least one support foot as recited in claim 1 and at least one mounting rail defining at least one of the first and second connecting parts and inserted into at least one of the first and second receptacles; and
   a fastener preventing the at least one of the first and second connecting parts from being pulled out of the holder.

10. The stand system as recited in claim 9 wherein the at least one mounting rail is C-shaped.

11. A support foot for applying and distributing forces to a pressure-sensitive substrate, comprising:
    a baseplate for placement onto the substrate;
    a holder joined to the baseplate, first and second connecting parts being attachable to the holder, the holder having a first receptacle for the first connecting part and a second receptacle for the second connecting part, wherein the first receptacle and the second receptacle have an overlapping area so that the second connecting part can protrude through the second receptacle into the first receptacle.

* * * * *